UNITED STATES PATENT OFFICE.

FRANK W. KENNEDY, OF TRENTON, NEW JERSEY, ASSIGNOR TO DE LAVAL STEAM TURBINE COMPANY, OF TRENTON, NEW JERSEY, A CORPORATION OF NEW JERSEY

OILING SYSTEM FOR GEARS

Application filed April 29, 1925. Serial No. 26,623.

My invention relates to a system for oiling gears and more particularly for oiling worm gears, helical gears, and the like.

In the operation of worm and helical gears and the like, it is, as is well known, desirable, and in most cases necessary, to lubricate the teeth of the gears in contact by means of a lubricating oil. Heretofore it has been customary to effect the necessary lubrication by arranging a supply of lubricating oil into which the gear or pinion will dip, or in which it is submerged. Such method of lubrication is open to serious objection on a number of grounds, chief among which are, especially when the gears are operated at high speed, that the friction of the rotating elements in the oil produces heat, which results in loss of power and makes necessary the use of coolers and that it is not always practical to obtain proper lubrication as the oil is thrown off from the dipping element before it reaches the surfaces in contact.

Now it is the object of my invention to provide a system for lubricating gears by which the objectionable dipping or immersion of the gear or pinion in the lubricating oil will be avoided and at the same time a system by which the gears will be satisfactorily lubricated under all conditions.

Having now indicated, in a general way, the nature and purpose of my invention, I will proceed to a detailed description thereof, with reference to the accompanying drawings, in which I have illustrated a preferred embodiment, and in which—

Figure 1:
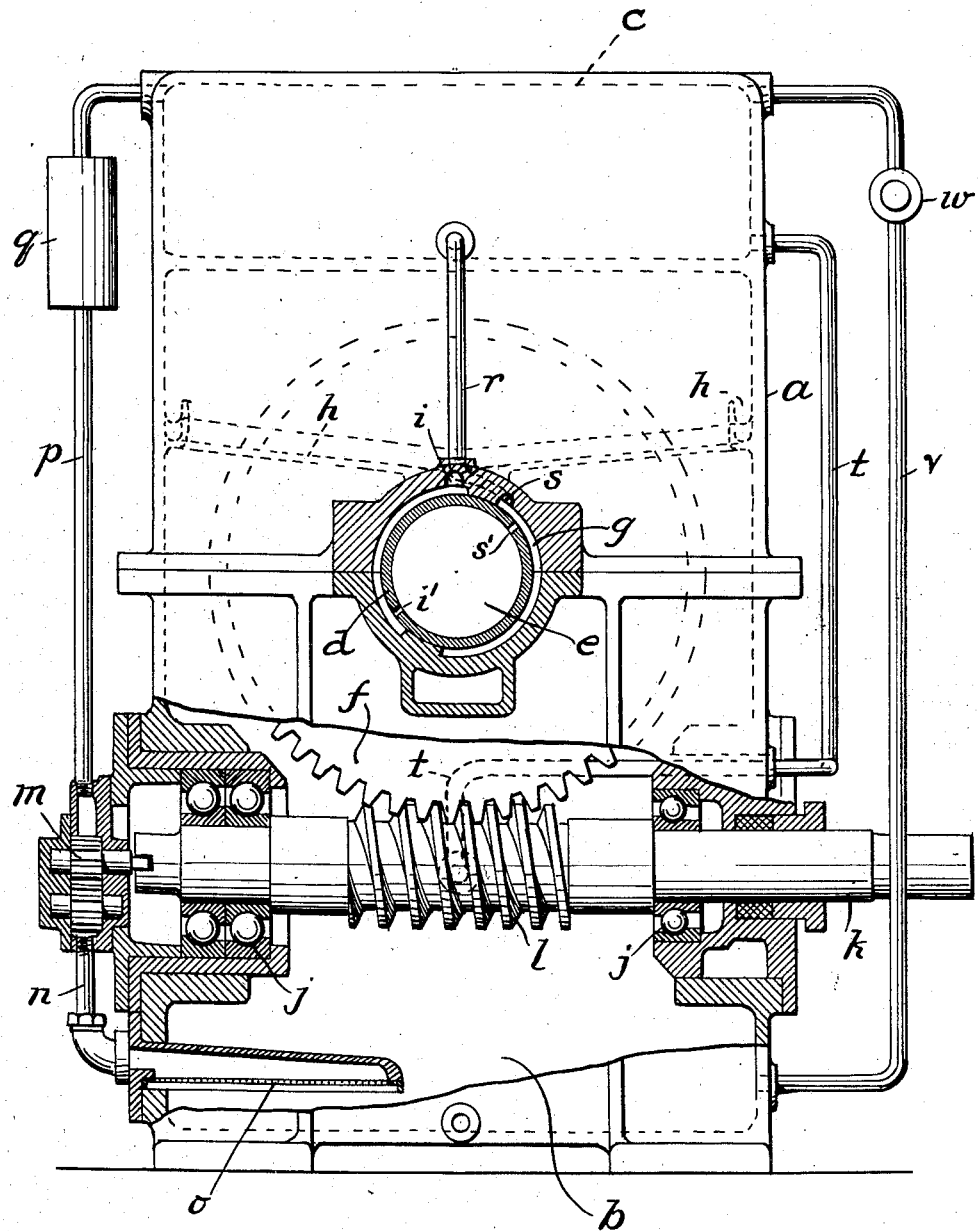
Fig. 1 is an end view of a gear assembly, partly in section and with the casing partly broken away.
Figure 2:
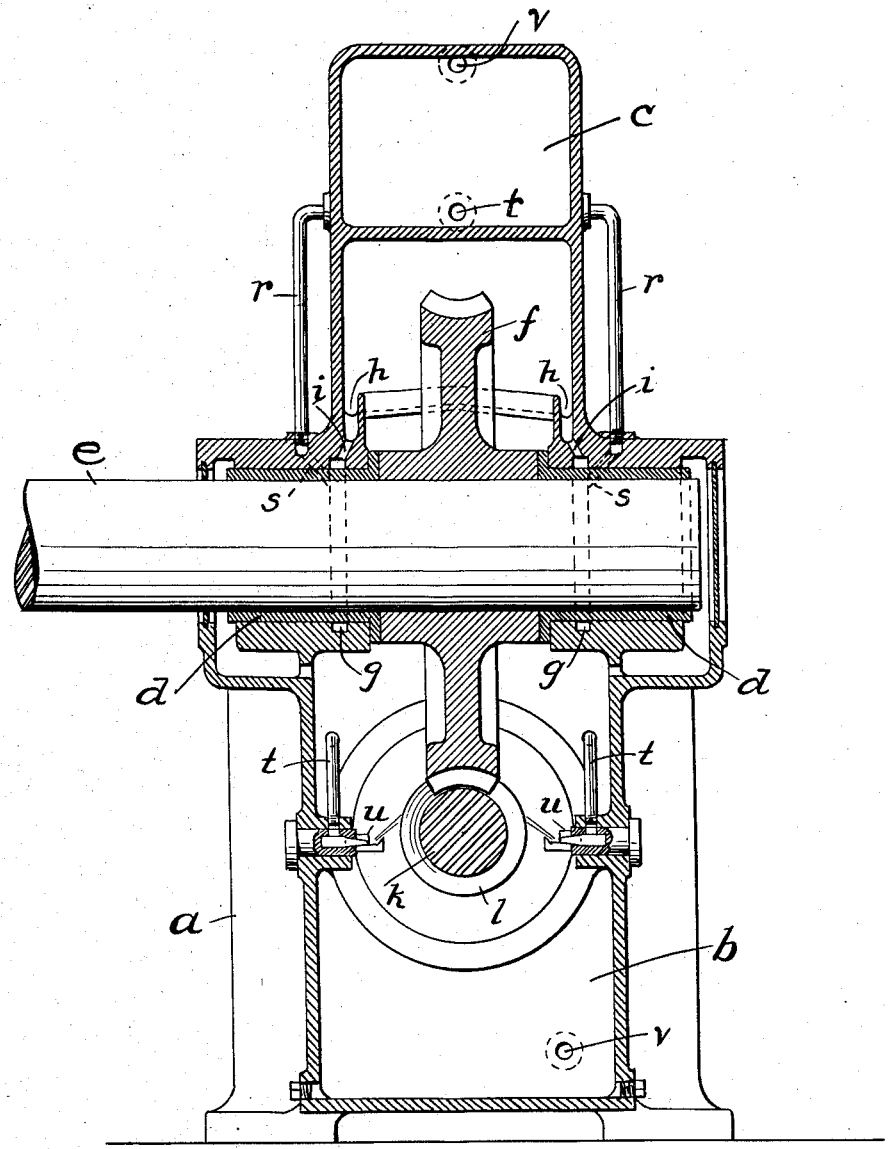
Fig. 2 is a sectional view of the subject of Fig. 1.

$a$ indicates a gear casing, the lower part of which forms an oil reservoir $b$ and in the upper part of which is formed an oil reservoir $c$.

The casing serves to support a pair of bushings $d$, in which is mounted a shaft $e$, upon which is secured a worm wheel $f$. Annular channels $g$ are formed in the casing about the bushings $d$ and are connected to an oil catching trough $h$ through passages $i$. The channels $g$ communicate with the interior of the bearing through holes $i'$.

Supported in bearings $j$ carried by the casing is a shaft $k$ upon which is cut a worm $l$ which meshes with the worm wheel $f$.

A gear or other type of oil pump $m$, driven by shaft $k$, is secured to the casing $a$ and its inlet connected to the lower portion of reservoir through a pipe $n$ and strainer $o$. The pump discharges through a pipe $p$ into the upper reservoir $c$, in which, if desired, the oil may be contained under pressure. A cooler $q$, of any efficient construction, may be included in the pipe $p$.

From near the bottom of the reservoir $c$, pipes $r$ lead to the annular channels $g$ which are in communication with the interior of the bushings on one side through holes $s'$.

Pipes $t$ lead from near the bottom of the reservoir $c$ to points adjacent the surfaces of the worm and wheel in contact where they terminate in nozzles $u$.

The reservoirs $b$ and $c$ are connected by means of a pipe $v$ in which is placed a relief valve $w$, for the relief of pressure beyond a predetermined degree in reservoir $c$.

In practice, the lower reservoir is filled with oil to a level above the top of the worm. When the worm is initially rotated and before the oil pump starts to pump, the surfaces of the worm and gear in contact are lubricated by oil picked up by the worm. As the gear rotates, it throws off oil which is caught by the catch trough $h$ and led by passages $i$ to the annular channels $g$ from whence it passes into and lubricates the bearings $d$.

As soon as the oil pump has reached sufficient speed to pick up the oil, it sucks the oil from the chamber $b$, passes it through the cooler $q$ and discharges it into the chamber $c$. The capacity of the pump is such that the oil is drawn down a minimum level, well below the worm, in chamber $b$ and chamber $c$ is filled, so that the oil therein is under pressure, although pressure on the oil in chamber $c$ is not essential; pressure above a predetermined degree being relieved by relief valve $w$ through pipe $v$.

Oil from chamber $c$ passes down pipes $r$ to annular channels $g$ and hence to bearings $d$ and down pipes $t$ and through nozzles $u$ to the surfaces of the worm and gear in contact. The oil after passing through the bushings $d$ and lubricating the worm and wheel returns to chamber $b$, from which it is again pumped up into chamber $c$ and reused.

As will now be clear from the above description, on starting of the worm and gear, they and the bearings of the worm gear shaft are lubricated in the ordinary manner by the submergence of the worm in the body of oil in reservoir $b$. However, before the disadvantages arising from the submergence of the worm can become apparent, the oil level in chamber $b$ is drawn down below the worm, and the worm and gear and the worm wheel shaft bushings are lubricated from reservoir $c$ into which the oil from reservoir $b$ is discharged by the pump.

It is also apparent from the invention that in case of failure of the oil pump during regular operation, the oil will descend to chamber $b$ and lubrication will be continued by the splash system.

It will be understood that my invention is not limited to the embodiment described and illustrated herein, since it is capable of variation in structure and application without departing from the spirit of my invention.

Having now fully descried my invention, what I claim and desire to protect by Letters Patent is:

1. Means for oiling gears in mesh comprising a reservoir adapted to hold a lubricant in sufficient quantity to submerge a part of the gear tooth structure when the gears are idle, a lubricant-receiving chamber, a pump adapted to convey oil from said reservoir to said chamber, said chamber having a capacity for an amount of oil which when removed from the reservoir will lower the level therein below the gears and said pump having a capacity such that when the gears are started the level of the oil in the reservoir will be lowered below the gears, and an oil conduit adapted to convey oil from said chamber to the gear teeth at a rate below the capacity of the pump.

2. Means for oiling gears in mesh comprising a reservoir adapted to hold a lubricant in sufficient quantity to submerge a part of the gear tooth structure when the gears are idle, a lubricant-receiving chamber, a conduit from the reservoir to the chamber, said conduit and chamber having a capacity smaller than the reservoir but large enough to receive an amount of oil sufficient to reduce the level of oil in the reservoir below the gear tooth structure, a pump adapted to convey the oil through said conduit from the reservoir to the chamber, and a conduit from the chamber to the gear teeth adapted to convey oil to the latter at a rate below the capacity of the pump.

3. Means for oiling gears in mesh comprising a reservoir adapted to hold a lubricant in sufficient quantity to submerge a part of the gear tooth structure, a lubricant-receiving chamber, a conduit from the reservoir to the chamber, said conduit and chamber having a capacity smaller than the reservoir but large enough to receive sufficient oil to reduce the level of oil in the reservoir below the submergence level specified, a pump adapted to convey the oil through said conduit from the reservoir to the chamber, a conduit from the chamber to the gear teeth adapted to convey oil to the latter at a rate below the rate at which the oil is adapted to be conveyed by the pump, a by-pass from the chamber to the reservoir, and a relief valve in the by-pass.

4. Means for oiling a pair of gears in mesh comprising a reservoir for oil, one of the gears being positioned within said reservoir, a second reservoir above the gears, a conduit leading from said second reservoir to a point adjacent the faces of the gears in contact, a pump adapted, on starting of the gears, to withdraw lubricant from said first mentioned reservoir and discharge into said second reservoir at a rate in excess of the rate of flow through said conduit, whereby the level of oil in said first mentioned reservoir will be lowered to a point below the gear within said reservoir on starting of the gears, means for maintaining pressure on the oil in said second reservoir, a conduit connecting said reservoirs, and a relief valve in said conduit.

5. Means for oiling a pair of gears in mesh comprising, in combination, a casing, a bearing therein for the support of the gears, an annular channel about said bearing, means affording a passage for oil from said channel to said bearing, a reservoir for oil containing one of the gears, a second reservoir for oil positioned above the gears, a trough for catching oil flying from said gears, means affording a passage for oil from said trough to said channel, a conduit for oil from said second reservoir to said channel, a conduit for oil from said second reservoir to a point adjacent the surfaces of the gears in contact, and a pump adapted, when the gears are rotated, to withdraw oil from said first mentioned reservoir and discharge into said second reservoir at a rate in excess of the rate of flow through said conduits.

In testimony of which invention, I have hereunto set my hand, at Trenton, New Jersey, on this 22nd day of April, 1925.

FRANK W. KENNEDY.